(12) United States Patent
Loeffler et al.

(10) Patent No.: US 6,414,080 B1
(45) Date of Patent: Jul. 2, 2002

(54) INVERSE EMULSION POLYMER AND PRODUCTION THEREOF

(75) Inventors: Randy J. Loeffler, Carnegie; Shih-Ruey T. Chen, Pittsburgh; Kevin W. Frederick, Evans City; James E. Rak, Pittsburgh, all of PA (US)

(73) Assignee: Calgon Corporation, Naperville, IL (US)

( * ) Notice: Subject to any disclaimer, the term of this patent is extended or adjusted under 35 U.S.C. 154(b) by 0 days.

(21) Appl. No.: 09/376,500

(22) Filed: Aug. 18, 1999

Related U.S. Application Data

(60) Provisional application No. 60/138,333, filed on Jun. 9, 1999.

(51) Int. Cl.[7] .......................... C08F 2/32; C08F 220/58
(52) U.S. Cl. ................ 524/801; 524/555; 524/547; 524/609; 524/812; 524/814; 524/817; 524/728; 526/288; 526/287; 526/307.1
(58) Field of Search ................ 524/555, 547, 524/609, 814, 801, 812, 817, 728; 526/287, 307.1, 288

(56) References Cited

U.S. PATENT DOCUMENTS

| | | | | |
|---|---|---|---|---|
| 4,672,090 A | * | 6/1987 | Chan | 524/728 |
| 4,745,154 A | * | 5/1988 | Ruffner | 524/801 |
| 4,764,574 A | * | 8/1988 | Clark, Jr. | 526/207 |
| 5,298,555 A | * | 3/1994 | O'Connor et al. | 524/801 |
| 5,354,801 A | * | 10/1994 | O'Toole | 524/461 |

* cited by examiner

*Primary Examiner*—David W. Wu
*Assistant Examiner*—Kelechi Egwim
(74) *Attorney, Agent, or Firm*—Michael B. Martin; Thomas M. Breininger

(57) ABSTRACT

Disclosed herein is an inverse emulsion polymer composition comprising a copolymer or copolymer salt of N,N,-dimethylacrylamide and 2-acrylamido-2-methylpropane sulfonic acid or acid salts thereof, having a Brookfield viscosity of less than 20,000 Cps at 23° C. and an active polymer concentration of about 25 to about 75 weight percent. The inverse emulsion polymer composition is in a hydrocarbon with a primary surfactant and optionally contains water.

15 Claims, No Drawings

INVERSE EMULSION POLYMER AND PRODUCTION THEREOF

This application claims the benefit of U.S. Provisional Application No. 60/138,333, filed Jun. 9, 1999.

FIELD OF INVENTION

The present invention relates to inverse emulsion polymers that are useful in delivering a high molecular weight, high solids concentration of a water-soluble polymer. The present invention further relates to these compositions for use in water treatment as a coagulant/flocculent, paper processes as a drainage and retention aid, in the oil field as a fluid loss additive, and in personal care as a keratin conditioner for hair and skin.

BACKGROUND OF THE INVENTION

Many polymerization processes and compositions are well known in many different fields. Aqueous solution polymerization techniques are known, but use low monomer concentrations and require that the resulting solution polymer be dried to prepare powder polymers, as disclosed in U.S. Pat. Nos. 4,555,269 and 4,515,635, the disclosures of which are incorporated herein by reference in their entirety. Should these dry polymers then be required to be formed into a flowable liquid phase, the powdered polymer must then be dispersed in a hydrocarbon carrier phase to be used in the resulting application. Copolymers of N,N,-dimethylacrylamide and 2-acrylamido-2-methylpropane sulfonic acid are known and disclosed in these patents. However, these dispersions have a high viscosity and are, therefore, difficult to handle and process. Particularly, these dispersions are hard to pump and generally have high Brookfield viscosities, greater than 30,000 Cps (mPa). These dispersions also have poor storage stability and tend to phase separate over time, sometimes as short as in a matter of days, particularly at the extremes of temperature. At both high and low temperatures, these dispersions phase separate fairly quickly. These dispersions also tend to have a poor pour point at low temperatures (i.e. they are difficult to pour).

It would be very desirable to produce a stable high molecular weight, soluble, easily handleable polymer composition and system that has a low viscosity, good storage stability, and a good low temperature pour point. With these properties, the composition could be directly applied and easily handleable. The product could be poured directly into the system needing the polymer, without special procedures. The product could be pumped with any commercially available pump. Should the polymer have these characteristics it would be useful in many more applications.

SUMMARY OF THE INVENTION

The present invention is an inverse emulsion composition that comprises a copolymer or copolymer salt of N,N,-dimethylacrylamide and 2-acrylamido-2-methylpropane sulfonic acid or acid salts thereof having a Brookfield viscosity of less than 20,000 centipoise (Cps) at 25° C., a polymer reduced viscosity at 0.05 gm/dl active in one Normal (1N) NaCl at 30° C. of about 3 to about 10 dl/gm, having an active polymer concentration of about 25 to about 75 weight percent, in about 0 to about 50 weight percent water, about 10 to about 50 weight percent hydrocarbon, and about 1 to about 10 weight percent primary surfactant at a pH of about 1 to about 8.

The present invention also comprises an inverse emulsion polymerization process comprising;
(1) forming a water-in-oil emulsion of an aqueous solution of the monomers N,N,-dimethylacrylamide and 2-acrylamido-2-methylpropane sulfonic acid or acid salts thereof in an inert hydrocarbon liquid organic dispersion medium and
(2) polymerizing said monomers in said dispersion medium to form a polymer emulsion, using a free radical generating catalyst to initiate the reaction, and controlling the temperature of the reaction mix to between about 5° and 105° C., wherein the composition contains an emulsifier/primary surfactant at a concentration of about 0.5 to about 10%, by weight, of the total emulsion.

A further improvement comprises producing the polymer in the process above in the presence of an effective chain transfer agent, such as 2-mercaptoethanol and a crosslinker, such as methylene bis-acrylamide.

DETAILED DESCRIPTION OF THE INVENTION

The inventors have unexpectedly discovered an improved inverse emulsion polymer composition and process of forming such emulsion of a copolymer of N,N,-dimethylacrylamide and 2-acrylamido-2-methylpropane sulfonic acid, or salts thereof.

This composition is unexpectedly stable at low viscosity, has a low freeze point, has good storage stability, and has a good low temperature pour point, while having a high solid concentration of active polymer.

The composition contains at least the two named monomers (N,N,-dimethylacrylamide and 2-acrylamido-2-methylpropane sulfonic acid or acid salts thereof) but can have others present as well and thus can be a terpolymer or higher. Suitable examples preferred monomers include acrylamide, acrylic acid, and sodium vinyl sulfonate.

The ratio of the monomer N,N,-dimethylacrylamide to the monomer 2-acrylamido,-2-methyl propane sulfonic acid or acid salts thereof in the copolymer is preferably about 1:4 to about 4:1, more preferably about 1:2 to about 2:1, with a monomer ratio of N,N,-dimethylacrylamide to 2-acrylamido-2-methylpropane sulfonic acid of about 1:1.5 being most preferred. At ratios much greater than 1:4 there is not sufficient N,N,-dimethylacrylamide to provide the preferred nonionic character, whereas at ratios much greater than 4:1, concentrations of 2-acrylamido-2-methylpropane sulfonic acid or acid salts thereof are too low to provide the preferred anionic character.

The inverse emulsion polymer composition of the present invention has a Brookfield viscosity of less than 20,000 centipoise (Cps) at 25° C., preferably about 500 to about 10,000, with a Brookfield viscosity about 1,000 to about 5,000 being most preferred. Emulsions with a Brookfield viscosity of over 20,000 centipoise is an indication of undesirable particle size, generally resulting in poor emulsion stability. However, extremely low Brookfield viscosities, say of less than 100 centipoise are not practical due to the requirement of adding an extreamly high amount of surfactant.

The inverse emulsion polymer composition of the present invention has a polymer reduced viscosity at 0.05 gm/dl active in one Normal (1N) NaCl at 30° C. of about 3 to about 10 dl/gm, preferably about 3.5 to about 7 dl/gm. At a polymer reduced viscosity much higher than 10 dl/gm, the emulsion may have poor mixability in water. Whereas at reduced viscosities much below 3 dl/gm the emulsion has poor performance properties.

The inverse emulsion polymer composition of the present invention has an active polymer concentration of about 25 to about 75 weight percent, preferably about 30 to about 60 weight percent, with an active polymer concentration of about 35 to about 45 being most preferred. At a polymer concentration less than 25 weight percent it is not generally cost effective. However, concentrations of as low as 20, 15, 10, and even 5 weight percent could still be effective in the present invention. Whereas polymer concentrations over 75 weight percent are not practically possible. At concentrations much over about 50 weight percent the polymer produced in the emulsion is in a less desirable concentration and should be concentrated by removing at least a portion of the water, as is disclosed in U.S. Pat. No. 5,480,921, the disclosure of which is incorporated herein by reference in its entirety.

The inverse emulsion polymer composition of the present invention optionally has water. The polymer is produced in water but the water can be partially or totally removed as stated above. Thus the inverse emulsion composition of the present invention preferably contains about 0 to about 50 weight percent water. Water is preferably present in the composition of the present invention and that amount of water present in the emulsion of the present invention is preferred to be that amount that remains after emulsion polymerization, generally over 20 weight percent, more preferably about 20 to about 40 weight percent. This amount of water is generally limited by the amount of water present in the monomer solution.

The inverse emulsion polymer composition of the present invention preferably contains about 10 to about 50 weight percent hydrocarbon, more preferably about 15 to about 30 weight percent. At concentrations of hydrocarbon much below 10 weight percent a stable emulsion is difficult to prepare, and many times cannot be prepared. Whereas, at concentrations much over 50 weight percent the resulting emulsion is not cost effective due to the low solids (low polymer concentration).

The inverse emulsion composition of the present invention contains about 0.05 to about 10 weight percent of an emulsifier/primary surfactant, preferably about 1 to about 5 weight percent, with a weight percent of about 1.5 to about 3 primary surfactant being most preferred. At concentrations below 0.5 weight percent, a stable emulsion cannot be prepared and a concentration above about 10 weight percent is not practical, due to cost.

The inverse emulsion composition of the present invention is at a pH of about 1 to about 8, preferably about 1.5 to about 4, with a pH of about 1.5 to about 2.5 being most preferred. At a pH much higher than about 8 the N,N,-dimethylacrylamide (NNDMA) monomer might be hydrolized and at a low pH a stable emulsion cannot be produced. The pH of the polymer is only measured in the aqueous monomer phase in the emulsion.

The inverse emulsion composition of the present invention further comprises a salt that is at least soluble to a certain concentration in the composition in an amount up to about 8 weight percent. Salt is preferably present in the inverse emulsion composition of the present invention but the concentration of salt can vary between 0 and about 8 weight percent, preferably about 1 to about 8 weight percent with a weight percent of salt between about 1.4 to about 6.8 being most preferred. The presence of salt improves the make-down properties of the final aqueous solution, incorporating the product of the present invention. The upper amount of salt present in the composition is limited by the solubility of the particular salt in the aqueous monomer solution.

The inverse emulsion composition of the present invention preferably further comprises an inverting surfactant in a concentration up to about 5 weight percent, preferably about 0.05 to about 3 weight percent, with a weight percent of about 0.2 to about 2 inverting surfactant being most preferred. The inverting surfactant is not needed but it improves the polymer dissolution in water. Suitable inverting surfactants are those with an HLB of at least about 10, preferably 10 to 20, with an HLB of about 10 to about 15 being most preferred. The most preferred are the non-ionic inverting surfactants.

The composition of the present invention is preferably made according to the inverse emulsion polymerization process comprising;

(1) forming a water-in-oil emulsion of an aqueous solution of the monomers N,N,-dimethylacrylamide and 2-acrylamido-2-methylpropane sulfonic acid or acid salts thereof in an inert hydrocarbon liquid organic dispersion medium; and (2) polymerizing said monomers in said dispersion medium to form a polymer emulsion, using a free radical generating catalyst to initiate the reaction, and controlling the temperature of the reaction mix to between about 5° and 105° C., wherein the composition contains an emulsifier/primary surfactant at a concentration of about 0.5 to about 10%, by weight, of the total emulsion.

Water-in-oil emulsions are generally comprised of three primary components including: (1) a hydrophobic phase; (2) an aqueous phase; and (3) a surfactant system. The hydrophobic phase of the present invention generally comprises from about 5 to about 75%, by weight, of the emulsion. Any inert hydrophobic liquid can be used as the hydrophobic phase. Preferred hydrophobic liquids have from 3 to 30 carbon atoms and are more preferably selected from the group consisting of benzene, xylene, toluene, mineral oils, kerosene, naphtas, petroleums, and blends of aromatic and aliphatic hydrocarbons containing 4 or greater carbon atoms. Particularly preferred hydrophobic liquids are those selected from the group consisting of a narrow fraction of a branch-chain hydrocarbon sold by Witco Chemical Company under the tradename Kensol 61® and branch-chain isoparafinic hydrocarbons sold by Exxon under the tradename Isopar®. Preferred low pour point hydrocarbons include ESCAID 110, from Exxon Chemical and MAGIESOL 40, from Magie Brothers.

The aqueous phase of the present invention generally comprises from about 25 to about 95%, by weight, of the emulsion. This phase comprises the desired ethylenically unsaturated monomer or monomers and water. Additionally, this phase can contain an effective amount of a chelating agent, such as a sodium salt of ethylene diamine tetracetic acid (EDTA) or nitrolotriacetate (NTA), buffers, chain transfer agents or other additives. The monomer(s) to be polymerized generally comprise about 10 to about 60%, by weight of the aqueous phase, with the balance being primarily water.

The emulsifier/primary surfactant system generally comprises about 0.5 to about 20%, by weight, of the emulsion. Any surfactant system which effectively disperses an aqueous phase into a hydrophobic phase can be used. See, for example, U.S. Pat. No. 3,826,771, which discloses the use of sorbitan monooleate as water-in-oil emulsifying agent; U.S.

Pat. No. 3,278,506, which discloses the use of ethylene oxide condensates of fatty acid amides as emulsifiers; U.S. Pat. No. 3,284,393, which discloses the use of hexadecyl sodium patalate, sorbitan monooleate, sorbitan monostearate, cetyl or stearyl sodium pthalate and metal soaps as water-in-oil emulsifiers; and U.S. Pat. No. 4,024,097, which discloses the use of surfactant systems comprising an oil-soluble alkanolamide, such as Witcamidee® 511, which is commercially available from Witco Chemical Company, and one or more co-emulsifiers selected from the group consisting of unesterified dialkanol fatty amides, quaternized ammonium salts of fatty tertiary amines, salts of fatty tertiary amines, alkaline metal salts of fatty acids and alkyl or alkylaryl sulfates or sulfonates.

U.S. Pat. Nos. 4,672,090 and 4,772,659 disclose a surfactant system which comprises 25 to 85%, by weight, an oil-soluble alkanolamide; 5 to 35%, by weight, a polyoxyethylene derivative of a sorbitan ester (e.g. polyoxyethylene (s) monooleate); and 0 to 50%, by weight, sorbitan monooleate. Additionally, other surfactants, such as sorbitan monostearate, may be used in combination with these primary surfactants.

Emulsion polymers are preferably produced by first mixing the emulsifier/primary surfactant system with the hydrophobic phase. The aqueous phase is then typically prepared by adding the monomer(s) to water in the desired concentration. Additionally, a chelant, such as a sodium salt of EDTA, may be added to the aqueous solution and the pH of the aqueous phase may be adjusted to between about 1 and 8, depending on the monomer(s) used. The aqueous monomer phase is then added to the mix containing the hydrophobic liquid and the surfactant system. The surfactant system enables the aqueous phase, which contains the monomer or monomers to be polymerized, to be emulsified into the hydrophobic phase. Polymerization is then carried out in the presence of a free radical generating catalyst, and the temperature of the reaction mixture is generally maintained between about 5° and about 105° C., preferably between about 15° and about 105° C. with a temperature of about 20° and about 50° C. being more prefered, resulting in a water-in-oil emulsion polymer. Any type of free radical initiator or free radical generating catalyst can be used, including, for example, persulfate and azo initiators. High energy irradiation can also be used to initate polymerization. Preferred free radical generating catalysts include: sodium metabisulfite, tertiary butylhydroperoxide, 2,2' azobis (isobutyronitrile) and 2,2', azobis(2-amidinopropane) hydrochloride.

The free radical generating catalyst is present in the reaction in an amount sufficient to substantially polymerize the monomers present. This amount is preferably at least about 0.001 weight percent, more preferably about 0.002 to about 0.01 weight percent with a weight of about 0.0025 to about 0.003 being most preferred. At concentrations below about 0.001 weight percent, the reaction is not as fast as preferred, whereas at concentrations above about 0.01, the reaction rate is so fast that the temperature is difficult to control.

The inverse emulsion polymerization process according to the present invention is preferably conducted under an inert atmosphere (essentially oxygen free) at a temperature at about 15° C. to about 105° C. under agitation. At temperatures over about 105° C. the system may boil off the water and destroy the product. Whereas at lower temperatures the reaction rate is too slow to be effective.

The inverse emulsion polymerization process according to the present invention preferably comprises an additional step wherein the composition produced in the polymerization process is further modified by the addition of a inverting surfactant, preferably with an HLB of at least about 10.

The inverse emulsion polymerization process according to the present invention preferably comprises an additional step wherein the composition produced to according to the process is further is processed according to the step of scavenging unreacted monomer by the introduction of a free radical initiator. In the process according to the present invention, the free radical initiator and the free radical generating catalyst are the same.

The inverse emulsion polymer composition of the present invention is useful in water treatment as a coagulant/flocculent, paper processes as a drainage and retention aid, in the oil field as a fluid loss additive, and in personal care as a keratin conditioner for hair and skin. A specific and preferred use of this inverse emulsion polymer composition in the oil field as a fluid loss additive is described in U.S. Provisional Patent Application Serial No. 60/138,397 entitled "Well Cementing Methods Using Compositions Containing Liquid Polymeric Additives" filed Jun. 9, 1999 by Chatterji et al. (Halliburton Case No. HES 99.0194) filed as a complete application with the same title on Aug. 18, 1999 application Ser. No. 09/377,003, the disclosures of which are incorporated herein by reference in their entirety.

EXAMPLES

The following examples are intended to further illustrate and demonstrate the present invention, but should not be interpreted to limit the reasonable scope thereof.

Example 1

Isothermal Run 364.24 g of an oil phase and 1089.25 g of an aqueous monomer phase at pH 3.0 were added together and then heated to 35° C. over a period of 20 minutes under agitation at 650 rpm.

Composition of oil phase:
334.24g of mineral oil (MAGIESOL 40 from Magie Brothers)
22.50 g of alkanolamide (a fatty acid amide of diethanolamine)
1.50 g of sorbitan monooleate (SPAN 80 from Rhodia)
6.00 g of polyoxyethylene (5) sorbitan monooleate (TWEEN 81 from ICI)

Composition of aqueous monomer phase:
945.07 g of 52.1% active 2-acrylamido-2-methylpropanesulfonic sodium salt (remainder $H_2O$)
142.08 g of N,N,-dimethylacrylamide monomer
1.60 g of isopropanol (IPA)
0.50 g of sulfuric acid Composition of initiator solution:
75 ul of tertiary-butyl hydroperoxide
15.00 g of a 0.25% sodium metabisulfite solution Composition of post-treatment scavenger solution:
0.76 g of 2,2' azobis(2-amidinopropane)hydrochloride (V-50 from Wako)
4.50 g of H2O Composition of inverting surfactant:
26.25 g of nonionic surfactant alcohol ethoxylate After 20 minutes of pre-emulsification and with the temperature at 35° C., nitrogen purging was begun, tertiary-butyl hydroperoxide was added and the sodium metabisulfite solution was pumped into the mix at 0.1 ml/min. The temperature from polymerization was allowed to reached 38° C. at which point this temperature was maintained with cooling from an ice bath throughout the remainder of the reaction. The sodium metabisulfite feed rate was increased to 1 ml/min over 5 minutes after a 1° C. drop in temperature was observed to ensure completion of reaction. The total length of the reaction was 80 minutes.

At the end of the reaction, the sodium metabisulfite solution feed was terminated and the polymerized emulsion was heated to 52° C. over a period of 20 minutes at which point the post-treatment scavenger solution was added.

After a post-treatment hold period of 30 minutes, the emulsion was cooled to 45° C. and nonionic surfactant alcohol ethoxylate was added dropwise over 30 minutes. This addition was followed by a 30 minute hold period. The end product was then cooled to 25° C. and discharged.

The end product contained 42.3 wt % of active water soluble polymer which had a reduced viscosity measured at 0.05 g/dl in 1N NaCl of 8.8 dl/g and Brookfield viscosity of 2670 cps.

Example 2

Adiabatic Run 604.0 g of an oil phase and 2374.39 g of an aqueous monomer phase at pH 2.0 were added together and then purged with nitrogen over a period of 20 minutes under agitation at 650 rpm. Unless stated otherwise, the compounds were the same as those used in Example 1.

Composition of oil phase:

543.60 g of mineral oil 45.00 g of alkanolamide 12.00 g of polyoxyethylene(5)sorbitan monooleate 3.00 g of sorbitan monooleate 0.40 g of 2,2' azobis(isobutyronitrile) (VAZO 64 from DuPont)

Composition of aqueous monomer phase:

1867.81 g of 50.52% active 2-acrylamido-2-methylpropanesulfonic sodium salt (remainder $H_2O$)

272.30 g of N,N-dimethylacrylamide monomer 26.62 g of H2O 200.00 g of ammonium chloride 6.08 g of isopropanol 1.58 g of sulfuric acid Composition of initiator solution:

125 ul of tertiary-butyl hydroperoxide 9.00 g of a 0.25% sodium metabisulfite solution Composition of post-treatment scavenger solution:

1.50 g of 2,2'-azobis(2-amidinopropane)hydrochloride 7.50 g of H2O

Composition of inverting surfactant:

45.00 g of nonionic surfactant alcohol ethoxylate

After 20 minutes of pre-emulsification and with the temperature at 23.8° C., tertiary-butyl hydroperoxide was added and the sodium metabisulfite solution was pumped into the mix at 0.1 ml/min. The temperature from polymerization reached 82.8° C. in 46 mins.

The sodium metabisulfite solution feed was terminated 30 minutes after peak temperature at which point the emulsion was cooled to 50–55° C. and the post-treatment scavenger solution was added.

After a post-treatment hold period of 30 minutes, the emulsion was cooled to 45° C. and nonionic surfactant alcohol ethoxylate was added dropwise over 30 minutes. This addition was followed by a 30 minute hold period. The end product was then cooled to 25° C. and discharged.

The end product contained 40.0 wt % of active water soluble polymer which had a reduced viscosity measured at 0.05 g/dl in 1N NaCl of 5.2 dl/g and Brookfield viscosity of 2759 cps.

Example 3

The processes used in Examples 1 and 2 above were followed in preparing additional polymer, the conditions that varied are listed in the table below.

TABLE 1

| Example No. | RXN Scheme | % Active | Copolymer Composition mole %, AMPS/N,N DMA | pH of Aq. Phase | % IPA | % NH4Cl | % Inverting Surfactant |
|---|---|---|---|---|---|---|---|
| 1 | isothermal | 42.3 | 60/40 | 3.00 | 0.11 | 0 | 1.75 |
| 2 | adiabatic | 42.3 | 60/40 | 2.00 | 0.20 | 6.6 | 1.48 |
| 3 | isothermal | 42.3 | 60/40 | 3.00 | 0.11 | 1.47 | 1.75 |
| 4 | adiabatic | 42.5 | 60/40 | 2.50 | 0.11 | 0 | 1.75 |
| 5 | adiabatic | 42.3 | 60/40 | 2.50 | 0.11 | 1.47 | 1.75 |
| 6 | adiabatic | 42.3 | 60/40 | 3.00 | 0.11 | 1.47 | 1.75 |
| 7 | adiabatic | 42.3 | 60/40 | 2.50 | 0.43 | 1.47 | 1.75 |
| 8 | adiabatic | 42.3 | 60/40 | 2.50 | 0.50 | 1.47 | 1.75 |
| 9 | adiabatic | 42.3 | 60/40 | 2.00 | 0.30 | 6.6 | 1.48 |
| 10 | adiabatic | 42.3 | 60/40 | 2.00 | 0.43 | 1.47 | 1.48 |
| 11 | adiabatic | 42.3 | 50/50 | 1.75 | 0.30 | 6.6 | 1.48 |
| 12 | isothermal | 42.3 | 60/40 | 1.75 | 0.30 | 6.6 | 1.48 |
| 13 | adiabatic | 25.0 | 60/40 | 1.75 | 0.30 | 6.6 | 1.48 |
| 14 | adiabatic | 40.1 | 40/60 | 1.75 | 0.30 | 6.6 | 1.48 |
| 15 | isothermal | 40.0 | 40/60 | 1.75 | 1.00 | 6.6 | 1.48 |
| 16 | isothermal | 40.0 | 60/40 | 1.75 | 1.00 | 6.6 | 1.48 |

Example 4

The properties of the polymers produced in Examples 1–3 were measured. The results are below in Table 2.

TABLE 2

| Example No. | n.05 g/dl @ 30° C. in 1 N NaCl, dl/g | Brookfield Viscosity @ 25° C. cps | % Compaction |
|---|---|---|---|
| 1 | 8.8 | 2670 | 6.9 |
| 2 | 5.2 | 2759 | 9.7 |
| 3 | 8.4 | 2349 | 6.1 |
| 4 | 8.2 | 1950 | 6.8 |
| 5 | 8.0 | 1635 | 7.1 |
| 6 | 8.6 | 1485 | 4.3 |
| 7 | 7.0 | 3930 | — |
| 8 | 6.9 | 4264 | — |
| 9 | 4.7 | 2879 | 9.2 |
| 10 | 4.5 | 3204 | — |
| 11 | 5.0 | 2165 | — |
| 12 | 4.4 | — | — |
| 13 | 4.8 | — | — |
| 14 | 5.0 | 3204 | — |
| 15 | 6.3 | 2394 | — |
| 16 | 3.3 | — | — |

Example 5

For each Example 1–3, 9.8 grams of the emulsion polymer composition was added to 340 grams of dionized water and mixed for 5 minutes at 600 rpm. A Brookfield viscosity was then measured using a Brookfield Viscomiter (Model LV) using spindle number one at 30 rpm. The makedown viscosity is listed below in Table 3.

TABLE 3

| Example No. | Makedown Viscosity cps | Freshwater Fluid Loss Mls |
|---|---|---|
| 1 | — | 83 |
| 2 | 69 | 40 |
| 3 | — | 102 |
| 4 | — | 99 |
| 5 | — | 51 |
| 6 | — | 55 |
| 7 | 1140 | — |
| 8 | — | — |
| 9 | 82 | 36 |
| 10 | 185 | 34 |
| 11 | 100 | — |
| 12 | 62 | — |
| 13 | 90 | — |
| 14 | 103 | — |
| 15 | 136 | — |
| 16 | 31 | — |

Example 6

In this Example 6, a polymer similar to that prepared in Example 1 was produced using the same ratio of monomers as Example 1, except that 2-mercaptoethanol was used as a chain transfer agent instead of isopropanol and a croslinker (MBA) was also used, as illustrated below.

60/40 (mole %) 2-acrylamido- 2-methylpropanesulfonic sodium salt/N,N Dimethylacrylamide Composition of the oil phase 271.8 g of mineral oil (Magiesol 40)

22.5 g of alkanolamide (a fatty acid amide of diethanolamine)

1.5 g of sorbitan monooleate 6.0 g of polyoxyethylene (5) sorbitan monooleate
Composition of the aqueous phase 895.28 g of 52.7% active 2-acrylamido-2-methylpropanesulfonic sodium salt 48.9 g of Distilled water 0.076 g of methylene bis-acrylamide (125 ppm MBA)

100.0 g of ammonium chloride 136.15 g of N,N dimethylacrylamide monomer 0.25 sodium EDTA 1.31 g of sulfuric acid 0.0644 g of 2-mercaptoethanol (106 ppm 2-ME)
Composition of initiator solution 40 microliters of tertiary-butyl hydroperoxide 12 g of 1.0% sodium metabisulfite solution
Composition of post treatment scavenger solution 0.50 g of 2,2' azobis(2-amidinopropane) hydrochloric 4.0 g of distilled water
Composition of the inverting surfactant (affects invertability)

4.5 g of nonionic alcohol ethoxylate surfactant 301.8 grams of an oil phase and 1182.0304 g of aqueous phase at pH 1.75 were added together and then heated to 35 C. over a period of 20 minutes under agitation.

After 20 minutes of pre-emulsification and with the temperature at 35° C., nitrogen purging was begun, tertiary-butyl hydroperoxide was added and the sodium metabisulfite solution was pumped into the mix at 0.1 ml/min. The temperature from polymerization was allowed to reached 38° C. at which point this temperature was maintained with cooling from an ice bath throughout the remainder of the reaction. The sodium metabisulfite feed rate was increased to 1 ml/min over 5 minutes after a 1° C. drop in temperature was observed to ensure completion of reaction. The total length of the reaction is typically about 60 to 120 minutes.

At the end of the reaction, the sodium metabisulfite solution feed was terminated and the polymerized emulsion was heated to 52° C. over a period of 20 minutes at which point the post-treatment scavenger solution was added.

After a post-treatment hold period of 30 minutes, the emulsion was cooled to 45° C. and nonionic surfactant alcohol ethoxylate was added dropwise over 30 minutes. This addition was followed by a 30 minute hold period. The end product was then cooled to 25° C. and discharged.

The end product contained 40% active water soluble polymer which had a reduced viscosity measured at 0.05 g/dl in 1N NaCl of 4.3 dl/g. The specific results for the polymer of this Example 6 are listed below in TABLE 4.

Examples 7 & 8

The above Example 6 was repeated for the polymers labeled as Examples 7 and 8, while varying the amount of 2-ME (the chain transfer agent) and inverting surfactant. All other variables remained the same. The specifics are listed below in TABLE 4, along with those of Example 6.

TABLE 4

| Example # | 2-ME (ppm) | MBA (ppm) | Invertability (%) | Reduced Viscosity (dl/g) | Makedown Viscosity (cp) | Fluid Loss 1000 psig, 5% salt |
|---|---|---|---|---|---|---|
| 7 | 100 | 125 | 0 | 4.32 | 63 | 36/60 |
| 8 | 125 | 125 | 100 | 3.74 | 40 | 84 |
| 6 | 106 | 125 | 40 | 4.20 | 86 | 58 |

The products of these Examples 6–8 show much better fluid loss control in salt water than the products of Examples 1–5. Thus, these products are much less sensitive to make-down water chemistry.

What is claimed is:

1. An inverse emulsion polymer composition comprising a copolymer or copolymer salt of N,N,-dimethylacrylamide and 2-acrylamido-2-methylpropane sulfonic acid or acid salts thereof having a Brookfield viscosity of less than 20,000 Cps at 25° C., a polymer reduced viscosity at 0.05 gm/dl active in one normal NaCl at 30° C. of about 3 to about 10 dl/gm, having an active polymer concentration of about 25 to about 75 weight percent in about 0 to about 50 weight percent water, about 10 to about 50 weight percent hydrocarbon, and about 0.5 to about 10 weight percent primary surfactant, at a pH of about 1 to about 8.

2. The composition according to claim 1 wherein said inverse emulsion polymer composition has a ratio of monomers in the copolymer of N,N,-dimethylacrylamide to 2-acrylamido-2-methylpropane sulfonic acid of about 1:4 to about 4:1, a Brookfield viscosity of about 500 to about 10,000 Cps, a polymer reduced viscosity of about 3.5 to about 7 dl/gm, a concentration of active polymer of about 30 to about 60 weight percent, a hydrocarbon concentration of about 15 to about 30 weight percent, a primary surfactant concentration about 1 to about 5 weight percent, and a pH of about 1.5 to about 4.

3. The composition according to claim 2 wherein the ratio of monomers in the copolymer of N,N,-dimethylacrylamide to 2-acrylamido-2-methylpropane sulfonic acid is about 1:2 to about 2:1.

4. The composition according to claim 1 wherein the composition further comprises a salt in an amount up to about 8 weight percent.

5. The composition according to claim 4 wherein the salt is in a concentration in the composition in an amount about 1 up to about 8 weight percent.

6. The composition according to claim 5 wherein the salt is in a concentration in the composition in an amount about 1.5 to about 7 weight percent.

7. The composition according to claim 1 wherein said copolymer is a copolymer salt selected from the group consisting of copolymer salts of calcium, magnesium and ammonium.

8. The composition according to claim 1 further comprising an inverting surfactant in a concentration up to about 5 weight percent.

9. The composition according to claim 8 wherein said inverting surfactant is in a concentration about 0.1 to about 3 weight percent.

10. The composition according to claim 9 wherein said inverting surfactant is in a concentration about 0.2 to about 2 weight percent.

11. The composition according to claim 1 wherein said Brookfield viscosity is about 1,000 to about 5,000 Cps.

12. The composition according to claim 1 wherein said a concentration of active polymer is about 35 to about 45 weight percent.

13. The composition according to claim 1 wherein water is present in said inverse emulsion polymer in a concentration of about 20 to about 40 weight percent.

14. The composition according to claim 1 wherein said primary surfactant is in a concentration of about 1.5 to about 3 weight percent.

15. The composition according to claim 1 wherein the polymer is slightly crosslinked or highly branched but still water soluble having the same polymer reduced viscosity at 0.05 gm/dl active in one normal NaCl at 30° C. of about 3 to about 10 dl/gm.

* * * * *